United States Patent
Brunsman et al.

(10) Patent No.: US 11,012,933 B2
(45) Date of Patent: May 18, 2021

(54) POWER MANAGEMENT BY POWERING OFF UNNECESSARY RADIOS AUTOMATICALLY

(71) Applicant: Google LLC, Mountain View, CA (US)

(72) Inventors: Lawrence Jonathan Brunsman, Mountain View, CA (US); Christian Sonntag, Mountain View, CA (US); Rajas Moonka, San Ramon, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/279,058

(22) Filed: Feb. 19, 2019

(65) Prior Publication Data

US 2019/0182769 A1   Jun. 13, 2019

Related U.S. Application Data (62) Division of application No. 14/814,178, filed on Jul. 30, 2015, now Pat. No. 10,257,782.

(51) Int. Cl.
*H04W 52/02* (2009.01)
*H04W 4/02* (2018.01)
(Continued)

(52) U.S. Cl.
CPC ......... *H04W 52/0212* (2013.01); *H04W 4/02* (2013.01); *H04W 24/02* (2013.01);
(Continued)

(58) Field of Classification Search
CPC ... H04W 64/006; H04W 64/00; H04W 24/02; H04W 4/022; H04W 4/028; H04W 4/02;
(Continued)

(56) References Cited

U.S. PATENT DOCUMENTS

| 2009/0005097 A1 | 1/2009 | Shaffer et al. |
| 2009/0058720 A1* | 3/2009 | Shaw ..................... G01S 19/48 |
| | | 342/357.31 |

(Continued)

FOREIGN PATENT DOCUMENTS

| CN | 101296434 A | 10/2008 |
| JP | 2002246977 A | 8/2002 |
| JP | 201556678 A | 3/2015 |

*Primary Examiner* — Allahyar Kasraian (74) *Attorney, Agent, or Firm* — Honigman LLP; Brett A. Krueger (57) ABSTRACT

A system and method are provided for automatically shutting off or reducing power to certain radios in a client device based on collected wireless network quality parameters. The wireless network quality parameters are collected from wireless networks by various client devices in communication with the wireless networks. The client devices report the wireless network quality parameters to a server. The server collects wireless network quality parameters from a plurality of client devices and analyses the wireless network quality parameters from the plurality of client devices to determine a network quality for the particular wireless networks. The network quality is stored in a network quality database maintained by the server. When it is determined that a device is in an area of weak signal coverage, power to its radio is automatically reduced or shut off until the device leaves the area.

7 Claims, 9 Drawing Sheets

(51) Int. Cl.
  *H04W 24/02* (2009.01)
  *H04W 52/22* (2009.01)
  *H04W 52/28* (2009.01)

(52) U.S. Cl.
  CPC ....... *H04W 52/228* (2013.01); *H04W 52/283* (2013.01); *H04W 52/0235* (2013.01); *Y02D 30/70* (2020.08)

(58) Field of Classification Search
  CPC ..... H04W 24/00; H04W 4/027; H04W 52/02; H04W 52/0212; H04W 52/0254; H04W 4/021; H04W 52/0241; H04W 52/0258; H04W 48/08; H04W 52/282; H04W 52/283; G01S 19/34; G01S 19/07; Y02D 70/142; Y02D 70/146; Y02D 70/164; Y02D 70/1242; Y02D 70/1262; Y02D 70/1222; Y02D 70/00; Y02D 70/1224; Y02D 70/1264; Y02D 70/23; Y02D 70/40; G01C 21/165
  See application file for complete search history.

(56) References Cited

U.S. PATENT DOCUMENTS

| | | | |
|---|---|---|---|
| 2009/0318140 A1* | 12/2009 | Gamel | H04W 36/30 455/432.1 |
| 2010/0009643 A1* | 1/2010 | Haartsen | H04W 52/0251 455/127.5 |
| 2012/0172027 A1 | 7/2012 | Partheesh et al. | |
| 2014/0045481 A1* | 2/2014 | Fraley | H04W 52/0258 455/418 |
| 2014/0092889 A1* | 4/2014 | Chhabra | H04W 12/003 370/338 |
| 2014/0200038 A1* | 7/2014 | Rao | H04W 4/029 455/457 |
| 2014/0266883 A1 | 9/2014 | Lacatus et al. | |
| 2015/0099546 A1 | 4/2015 | Heo et al. | |

* cited by examiner

POWER MANAGEMENT BY POWERING OFF UNNECESSARY RADIOS AUTOMATICALLY

RELATED APPLICATIONS

This application is a divisional application of U.S. patent application Ser. No. 14/814,178, filed Jul. 30, 2015, having inventors Lawrence Jonathan Brunsman et al., titled "Power Management by Powering Off Unnecessary Radios Automatically", the contents of which are incorporated herein by reference in its entirety.

BACKGROUND

Client devices, such as a mobile phone or laptop, often have a plurality of available wireless networks to choose from in order to achieve network connectivity. Typically, an available wireless network is selected by a client device or a user of the client device. However, the client device and the user do not have access to certain historical network quality parameters that will inform a decision to select a wireless network to use for achieving the best network quality.

Additionally, while there are an abundance of wireless networks available for use by client devices, each individual client device may only be aware of the presence of a particular wireless network once the individual client device is within signal range of an access point of the wireless network. In this regard, the individual client device may be unable to determine what wireless network to attach to until it comes into signal range of the access point of the wireless network. This issue is exacerbated as the client device moves between various wireless network coverage areas. Moreover, for cellular networks, a phone radio that is already connected with one network cannot simultaneously scan for the presences of other networks. For such cellular networks, the phone must disconnect from one network before scanning for other networks. Accordingly, the wireless network selection process is inefficient.

Further, client devices often include multiple radios, such as one or more cellular radios (e.g., GSM, CDMA) and a WiFi (802.11) radio. These radios consume power when on, even if no data is being transmitted. Radios consume additional power when in low-signal environments, such as when they are searching for a high-quality signal.

BRIEF SUMMARY

One embodiment provides a method of providing network quality parameters for a wireless network from a client device, the method comprising: communicating with a wireless network over a network interface of the client device; measuring, by a client application residing on the client device, the network quality parameters for the wireless network; providing, by the client application, the network quality parameters to a reporting module of the client device; collecting, by the reporting module, network information associated with the network quality parameters; and sending, by the reporting module, the network information and the network quality parameters to a server over the wireless network.

Another embodiment provides a method of providing a database of wireless networks based on network quality, the method comprising: receiving network quality parameters for a wireless network collected by a client device attached to the wireless network; receiving network information associated with the network quality parameters; aggregating the network quality parameters with previously received network quality parameters for the wireless network based on the network information; processing the network quality parameters and the previously received network quality parameters to determine a wireless network quality for the wireless network.

Yet another embodiment provides a non-transitory computer readable storage device for collecting network quality parameters by a client application residing on a client device, the non-transitory computer readable storage device having computer executable instructions for performing the steps of: communicating with a wireless network over a network interface of the client device; measuring, by a client application residing on the client device, the network quality parameters for the wireless network; providing, by the client application, the network quality parameters to a reporting module of the client device; collecting, by the reporting module, network information associated with the network quality parameters; and sending, by the reporting module, the network information and the network quality parameters to a server over the wireless network.

Other aspects, objectives and advantages of the disclosure will become more apparent from the following detailed description when taken in conjunction with the accompanying drawings.

BRIEF DESCRIPTION OF THE SEVERAL VIEWS OF THE DRAWING(S)

The accompanying drawings incorporated in and forming a part of the specification illustrate several aspects of the present disclosure and, together with the description, serve to explain the principles of the disclosure. In the drawings.

DETAILED DESCRIPTION

Client devices, such as a mobile phone or laptop, often have a plurality of available wireless networks to choose from in order to achieve network connectivity. Typically, an available wireless network is selected by a client device or a user of the client device. However, the client device and the user do not have access to certain historical network quality parameters that may inform a decision to select a wireless network to use for achieving the best network quality.

Additionally, while there are an abundance of wireless networks available for use by client devices, each individual client device may only be aware of the presence of a particular wireless network once the individual client device is within signal range of an access point of the wireless network. In this regard, the individual client device may be unable to determine what wireless network to attach to until it comes into signal range of the access point of the wireless network. This issue is exacerbated as the client device moves between various wireless network coverage areas. Moreover, for cellular networks, a phone radio that is already connected with one network cannot simultaneously scan for the presences of other networks. For such cellular networks, the phone must disconnect from one network before scanning for other networks, even if the phone is within range of other networks. Accordingly, the wireless network selection process is inefficient.

Therefore, to improve wireless network selection efficiency, quality parameters relating a wireless network quality can be collected over time and utilized to determine which wireless network a client device will attach to out of a plurality of available wireless networks. Embodiments of the disclosure described herein provide a system to collect and analyze quality parameters and other network and geographic information related to wireless networks. Using the collected quality parameters and network and geographic information, the system is able to build a searchable database providing wireless network quality in various geographic areas for various wireless networks where quality parameters and wireless network information is collected. In certain embodiments, the wireless network will be searchable based on wireless network identification information and a geographic location of a client device. The system is then able to provide access to the database in order to support a variety of uses, such as making an informed decision on wireless network selection or planning future data downloads based on a route of travel of the client device. In this manner, a database containing known network characteristics may be used, for example, to conserve power in a mobile device, or to provide a more seamless connectivity experience to the user.

Figure 1:
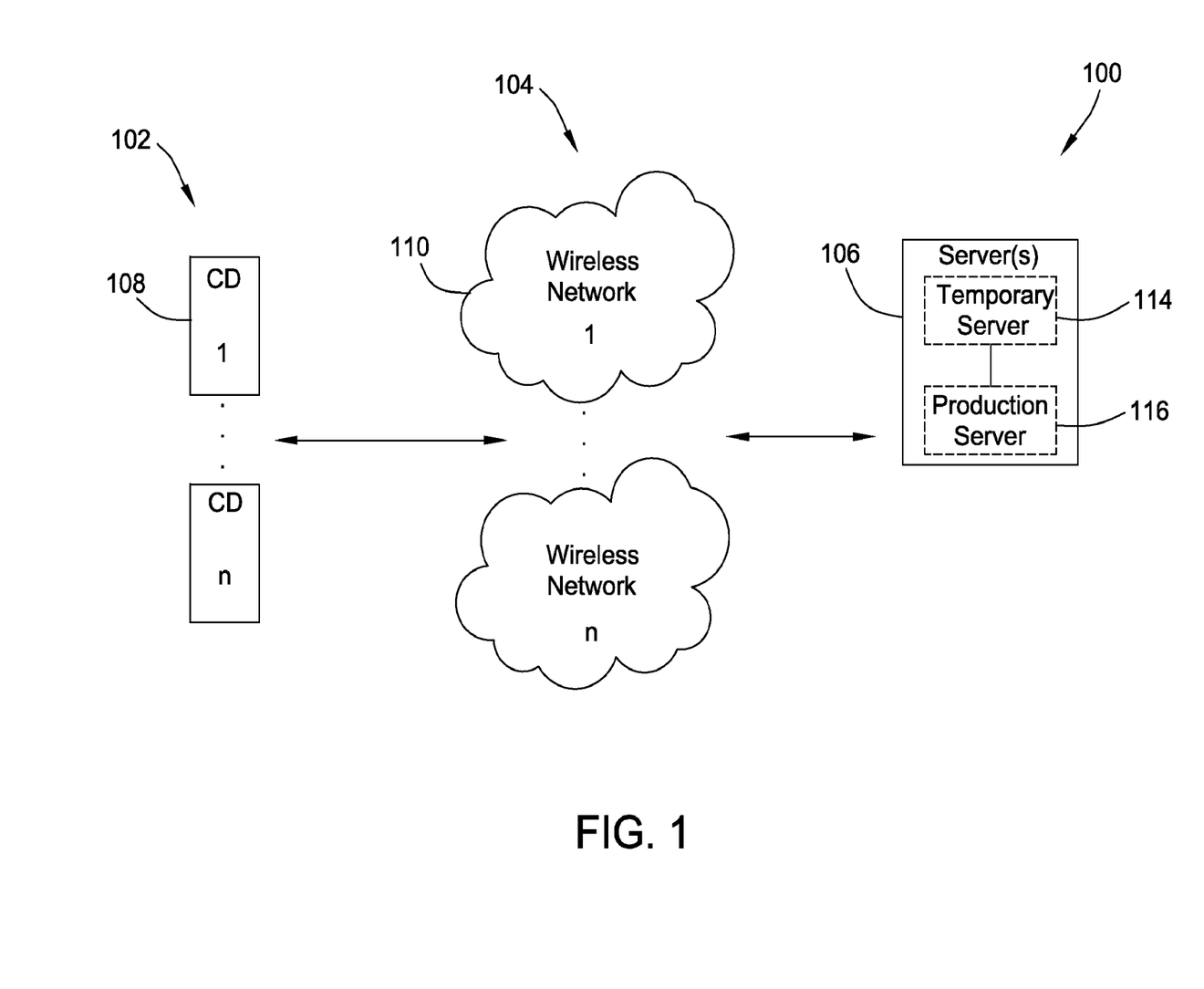
FIG. 1 is a block diagram illustrating a system for collecting wireless network data, according to an example embodiment.

FIG. 1 illustrates a block diagram of an example communications system 100 in which various embodiments of the present disclosure may be implemented. In the communications system 100 depicted in FIG. 1, a plurality of client devices 1-n 102 are shown in relation to a plurality of wireless networks 1-n 104, which in turn is shown in relation to a server 106. The plurality of client devices 102 collect quality parameters from the plurality of wireless networks 104, which the plurality of client devices 102 has available while they travel around various geographic locations. The quality parameters collected by the plurality of client devices 102 are then transferred to the server 106, which analyzes the quality parameters to build a database of summarized quality parameters in each geographic location. The server 106 then shares this database with each individual client device, such as client device 108, comprising the plurality of client devices 102. The plurality of client devices 102 can then make an informed decision on which wireless network of the plurality of wireless networks 104 to connect. Alternatively, the database of server 106 may contain network quality information gathered from sources other than client devices.

The quality parameters may include only a single parameter or a multitude of parameters. For instance, the quality parameters may include at least one of a bit error rate, a signal strength such as a received signal strength indicator (RSSI), a network latency as determined by the time it takes from an HTTP request to an HTTP response, and network throughput measured in bits/second and used to determine a time it takes to transmit a known amount of data packets.

The plurality of client devices 102 may be a mobile device such as a smart phone, a tablet computer, a laptop computer, a watch with a computer operating system, a personal digital assistant (PDA), a video game console, a wearable or embedded digital device(s), or any one of a number of additional devices capable of communicating over the plurality of wireless networks 104.

The plurality of wireless networks 104 include but are not limited to Wide Area Networks (WAN) such as a Long Term Evolution (LTE) network, a Global System for Mobile Communications (GSM) network, a Code Division Multiple Access (CDMA) network, a Wideband Code Division Multiple Access (WCDMA) network, Wireless Local Area Networks (WLAN) such as the various Wi-Fi networks operating under the various IEEE 802.11 standards, or any other kind of wireless network. The plurality of wireless networks 104 allow the plurality of client devices 102 to communicate with the server 106. For example, client device 108 may transmit information to the server 106 and receive information from the server 106 through wireless network 110. Further, the plurality of wireless networks 104 may include a set of cell towers, as well as a set of base stations and/or mobile switching centers (MSCs). In some embodiments, the plurality of wireless networks 104 may include various cell tower/base station/MSC arrangements.

As an aside, whether because of technological limitations or geographic limitations, not every client device of the plurality of client devices 102 will be able to connect to each of the plurality of wireless networks 104. In this manner, each individual client device from the plurality of client devices 102 will only report quality parameters from the individual wireless networks the individual client device is able to communicate with. For ease of description, embodiments of the disclosure described herein will refer to the plurality of client devices 102 collecting quality parameters from the plurality of data networks 104 even though it is understood that not every client device of the plurality of client devices 102 will communicate with every wireless network.

Further, server 106 is illustrated as a single server. However, server 106 could be implemented as a plurality of servers servicing specified geographic locations, or server 106 could be implemented as a cloud server. The singular server 106 is illustrated for ease of description. This singular server illustration is not intended to limit the disclosure contained herein. Also, the server 106 is illustrated as including a temporary server 114 and a production server 116. The temporary server 114 and the production server 116 may be included as software servers within server 106 or as separate servers communicatively coupled in a cluster of servers 106. The temporary server 114 functions to receive data reported from the plurality of client devices 102 and temporarily store the data for holding and analyzing the data prior to transfer to the production server 116. Once the production server 116 receives the data, such as the quality parameters, from the temporary server 114, the production server 116 aggregates the data and stores it in a searchable database (see FIG. 4).

As an aside, in certain embodiments, the data stored in the database by the production server 116 is aggregated and stored for a finite period of time, such as one day, one week, one month, three months or longer. In this regard, the network quality as determined by the quality parameters for the plurality of wireless networks 104 will be built upon recently collected relevant data. The data stored in the database is preferably aggregated from a number of different devices. The aggregated database data may therefore be normalized, to account for differences in hardware, software, radio, firmware, time of day, etc.

As the discussion of the various devices, systems and methods contained herein progresses, at points only a singular client device 108 or a singular wireless network 110 may be discussed. In this regard, client device 108 or wireless network 110 are only referenced as being generally representative of the plurality of client devices 102 and the plurality of wireless networks 104, respectively. Therefore, the functionality of client device 108 can be imported to the plurality of client devices 102, and the functionality of wireless network 110 can be imported to the plurality of wireless networks 110.

The plurality of client devices 102 may collect further data beyond the quality parameters associated with the plurality of wireless networks 104. In certain embodiments, the plurality of client devices 102 will also collect wireless network identification information utilized to uniquely identify a wireless network and an access point for that wireless network.

In certain embodiments, client device 108 may transmit information to the server 106 and receive information from the server 106 through wireless network 110, and wireless network 110 may be a Wi-Fi wireless network. In this instance, the client device 108 would collect identification information including at least one of a Basic Service Set Identification (BSSID) and a Service Set Identification (SSID). In certain embodiments, the client device 108 will collect both the SSID and the BSSID, which will uniquely identify an access point for the Wi-Fi wireless network 110. However, in other embodiments the Wi-Fi wireless network 110 may indicate that it does not want to be uniquely identified. For instance, the SSID may contain the term "nomap" in the name field, which indicates that the particular Wi-Fi wireless network 110 does not wish to have data uniquely identifying the network collected. In this embodiment, the client device 108 will only collect BSSID information, such as the MAC address of the wireless network 110 access point.

In certain embodiments, client device 108 may transmit information to the server 106 and receive information from the server 106 through wireless network 110, and wireless network 110 may be a cellular wireless network. In this instance, the client device 108 would collect identification information that uniquely identifies an access point for the cellular wireless network 110. For instance, the identification information could be an identifier of a cellular base station, such as a CellID. If the cellular wireless network 110 is a CDMA network, then the identification information could include a NetworkID, a SystemID and/or a BasestationID. If the cellular wireless network 110 is a GSM or WCDMA network, then the identification information could include a Mobile Country Code (MCC), a Mobile Network Code (MNC) and/or a Location Area Code (LAC). If the cellular wireless network 110 is an LTE network, then the identification information could include a MCC, a MNC, a Tracking Area Code (TAC) and/or a physical Cell Identity (CI).

Further, in certain embodiments, the identification information may indicate a type of cellular wireless network. For instance, the identification information may further include information regarding whether the wireless network 110 is an Evolution Data-Optimized (EVDO) network, a High Speed Packet Access (HSPA) network or an LTE network.

Whether the wireless network 110 is a Wi-Fi wireless network or a cellular wireless network, the identification information is associated with the quality parameters for the wireless network 110 and sent to the server 106. In this regard, the quality parameters are associated with a unique wireless network or unique access point of the wireless network.

Additionally, in certain embodiments, the client device 108 may collect location data that indicates a location of the client device 108 while collecting the quality parameters. In certain embodiments, the location data includes a latitude, a longitude and a timestamp of when the location data is determined. Generally, the latitude and longitude are collected to a certain precision that allows the location of client device 108 to be determined, for example, to within about 5-about 100 meters. In doing so, the latitude and longitude data will be coarsened to the sixth decimal digit. One such technique to coarsen the longitude and latitude data is to multiply a raw latitude or longitude measurement by, for example, about 1,000,000 and truncate any places in the resulting number beyond six digits after the decimal.

If collected, the location data will be associated with the quality parameters and identification information and sent to the server 106. In this regard, a location of the client device 108 is associated with the quality parameters and the identification information such that a map of wireless network quality can be determined based on the data in database.

As an aside, the location data will only be collected if a user of the client device 108 has indicated that location data may be collected from the client device 108. In this regard, if the user configures the client device 108 such that location data is not to be collected, then location data for the client device 108 will not be collected.

Additionally, other types of network information can be collected by the client device 108. For instance, the client device 108 may collect a timestamp of when the quality parameters were collected and associate that timestamp with the quality parameters as they are sent to the server 106. For clarity, the timestamp collected at the time of collecting the quality parameters may be different than a timestamp collected at the time of determining a location of the client device 108.

In certain embodiments, the client device 108 may also collect data indicating a name and version of an application residing on the client device 108, where the application is utilized to collect the quality parameters. Also, the client device 108 may collect data indicating whether the wireless network 110 is a captive portal or a tethered network. The data indicating whether the wireless network 110 is a captive network or a tethered portal may be in the form of a true/false bit.

Figure 2:
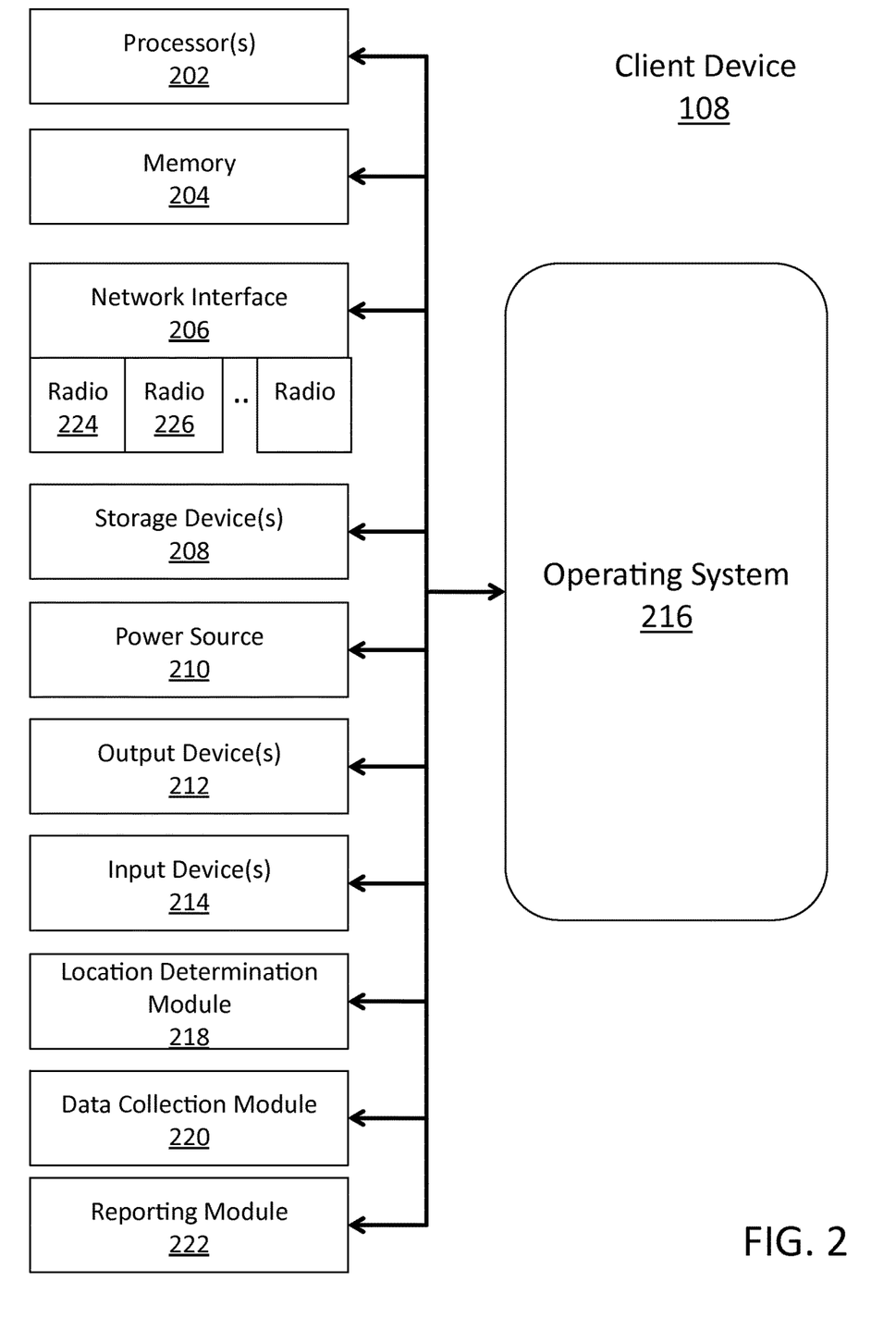
FIG. 2 is a block diagram illustrating components of a client device from the system illustrated in FIG. 1, according to an example embodiment.

Turning now to FIG. 2, a block diagram of basic functional components for an individual client device, such as client device 108 (see FIG. 1), of the plurality of client devices 102 (see FIG. 1), according to one aspect of the disclosure, is illustrated. In general, many other embodiments of the client device 108 may be used. In the illustrated embodiment of FIG. 2, the client device 108 includes one or more processors 202, memory 204, one or more network interfaces 206, one or more storage devices 208, power source 210, one or more output devices 212, one or more input devices 214, a location determination module 218, a data collection module 220 and a reporting module 222. Also shown are first radio 224 and second radio 226, in conjunction with the one or more network interfaces 206. Additional radios may be present. The client device 108 also includes an operating system 216. Each of the components including the processor 202, memory 204, one or more network interfaces 206, storage device 208, power source 210, output device 212, input device 214, location determination module 218, data collection module 220, reporting module 222 and the operating system 216 is interconnected physically, communicatively, and/or operatively for inter-component communications.

As illustrated, processor 202 is configured to implement functionality and/or process instructions for execution within client device 108. For example, processor 202 executes instructions stored in memory 204 or instructions stored on a storage device 208. Memory 204, which may be a non-transient, computer-readable storage medium, is configured to store information within client device 108 during operation. In some embodiments, memory 204 includes a temporary memory, an area for information not to be maintained when the client device 108 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some examples, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 108 uses one or more network interfaces 206 to communicate with external devices via one or more networks, such as the plurality of wireless networks 104 (see FIG. 1), and other types of networks through which a communication with the client device 108 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and USB. The one or more network interfaces 206 may include a first radio 224 and a second radio 226, and a number of additional radios. For example, the first radio 224 may be used for voice communications over a first cellular network (e.g., CDMA), while the second radio 226 may be used for Wi-Fi communications. Additional radios may be present to facilitate communications over additional cellular networks, Bluetooth, GPS, etc. In embodiments of the disclosure, radios 224 and 226 and other included radios include capability for shutting power individually, so one radio may be turned off while another may remain on. In some embodiments, a device may have multiple cellular radios active at once, in addition Wi-Fi and/or other radios.

The client device 108 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone or any other type of input device. In some examples, a presence-sensitive screen includes a touch-sensitive screen.

One or more output devices 212 are also included in client device 108. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 108 includes one or more power sources 210 to provide power to the device. Non-limiting examples of power source 210 include single-use power sources, rechargeable power sources, and/or power sources developed from nickel-cadmium, lithium-ion, or other suitable material.

The client device 108 includes an operating system 216. The operating system 216 controls operations of the components of the client device 108. For example, the operating system 216 facilitates the interaction of the processor(s) 202, memory 204, network interface 206, storage device(s) 208, input device 214, output device 212, and power source 210.

The client device 108 uses the location determination module 218 to determine a geographic location of the client device 108. This location determination module 218 may be a GPS transceiver or a state of the processor 202, which is defined by a series of instructions stored on the memory 204 or storage device 208 that when executed cause the processor 202 to triangulate a geographic location of the client device 108 based on any available wireless network connections.

In certain embodiments of the disclosure, the client device 108 further includes a data collection module 220 and a reporting module 222. In certain embodiments, both the data collection module 220 and the reporting module 222 represent various states of the processor 202, and are defined by program instructions and/or data stored on the memory 204 or the storage device 208.

The data collection module 220 configures the client device 108 to collect quality parameters and other forms of network information such as the wireless network identification information and the location data, as discussed above in relation to FIG. 1, from the plurality of wireless networks 104 (see FIG. 1). Once the quality parameters and other information are collected for an individual wireless network, such as wireless network 110 (see FIG. 1), then the data collection module 220 provides quality parameters and the other network information to the reporting module 222.

The reporting module 222 configures the client device 108 to upload, to the server 106 (see FIG. 1), the identification information associated with the wireless network 110, location data pertaining to a location of the client device 108 when the quality parameters were collected, and the actual quality parameters collected.

Figure 3:
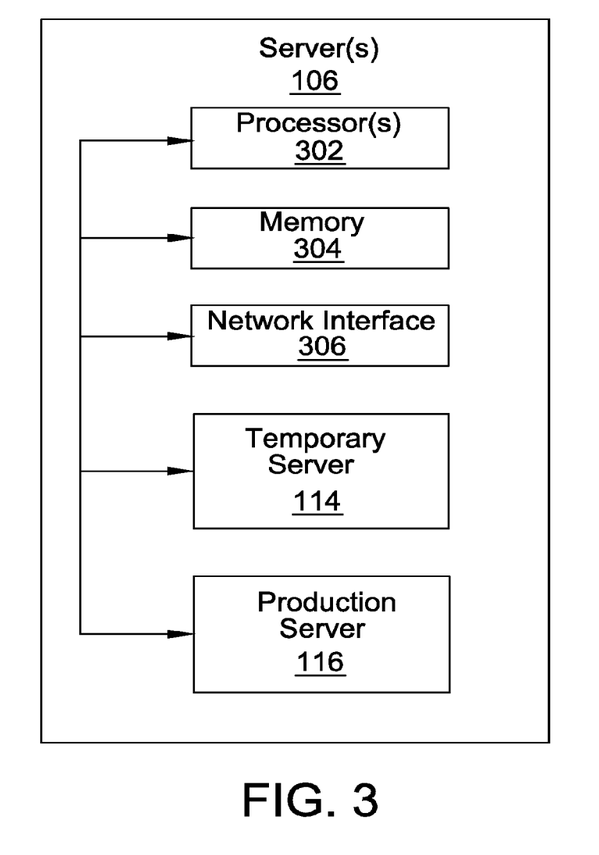
FIG. 3 is a block diagram illustrating components of a server or cluster of servers from the system illustrated in FIG. 1, according to an example embodiment.

Turning to FIG. 3, a block diagram of basic functional components for a server or cluster of servers 106 (see FIG. 1) is depicted, according to one aspect of the disclosure.

Specifically, server 106 is configured to receive performance parameters for the plurality of data networks 104 (see FIG. 1) and create a database of summarized quality parameters arranged by wireless network identification information that uniquely identifies individual access points corresponding to individual wireless networks of the plurality of wireless networks 104.

The server 106 includes one or more processors 302, memory 304, network interface 306, a temporary server 114 and a production server 116. In some embodiments, each of the components including the processor(s) 302, memory 304, network interface 306, temporary server 114 and production server 116 are interconnected physically, communicatively, and/or operatively for inter-component communications.

As illustrated, processors 302 are configured to implement functionality and/or process instructions for execution within server 106. For example, processors 302 execute instructions stored in memory 304. Memory 304, which may be a non-transient, computer-readable storage medium, is configured to store information within server 106 during operation. In some embodiments, memory 304 includes a temporary memory, i.e. an area for information not to be maintained when the server 106 is turned off. Examples of such temporary memory include volatile memories such as random access memories (RAM), dynamic random access memories (DRAM), and static random access memories (SRAM). Memory 304 also maintains program instructions for execution by the processors 302.

The server 106 uses network interface 306 to communicate with external devices via one or more networks, such as the plurality of wireless networks 104 of FIG. 1. Such networks may include one or more wireless networks, wired networks, fiber optics networks, and other types of networks through which communication between the server 106 and an external device may be established. Network interface 306 may be a network interface card, such as an Ethernet card, an optical transceiver, a radio frequency transceiver, or any other type of device that can send and receive information.

As mentioned above, the server 106 is illustrated as including a temporary server 114 and a production server 116. The temporary server 114 and the production server 116 may be included as software servers within server 106 or as separate servers communicatively coupled in a cluster of servers 106. The temporary server 114 functions to receive data reported from the plurality of client devices 102 and temporarily store the data for holding and analyzing the data prior to transfer to the production server 116. Once the production server 116 receives the data, such as the quality parameters, from the temporary server 114, the production server 116 aggregates the data and stores it in a searchable database.

Figure 4:
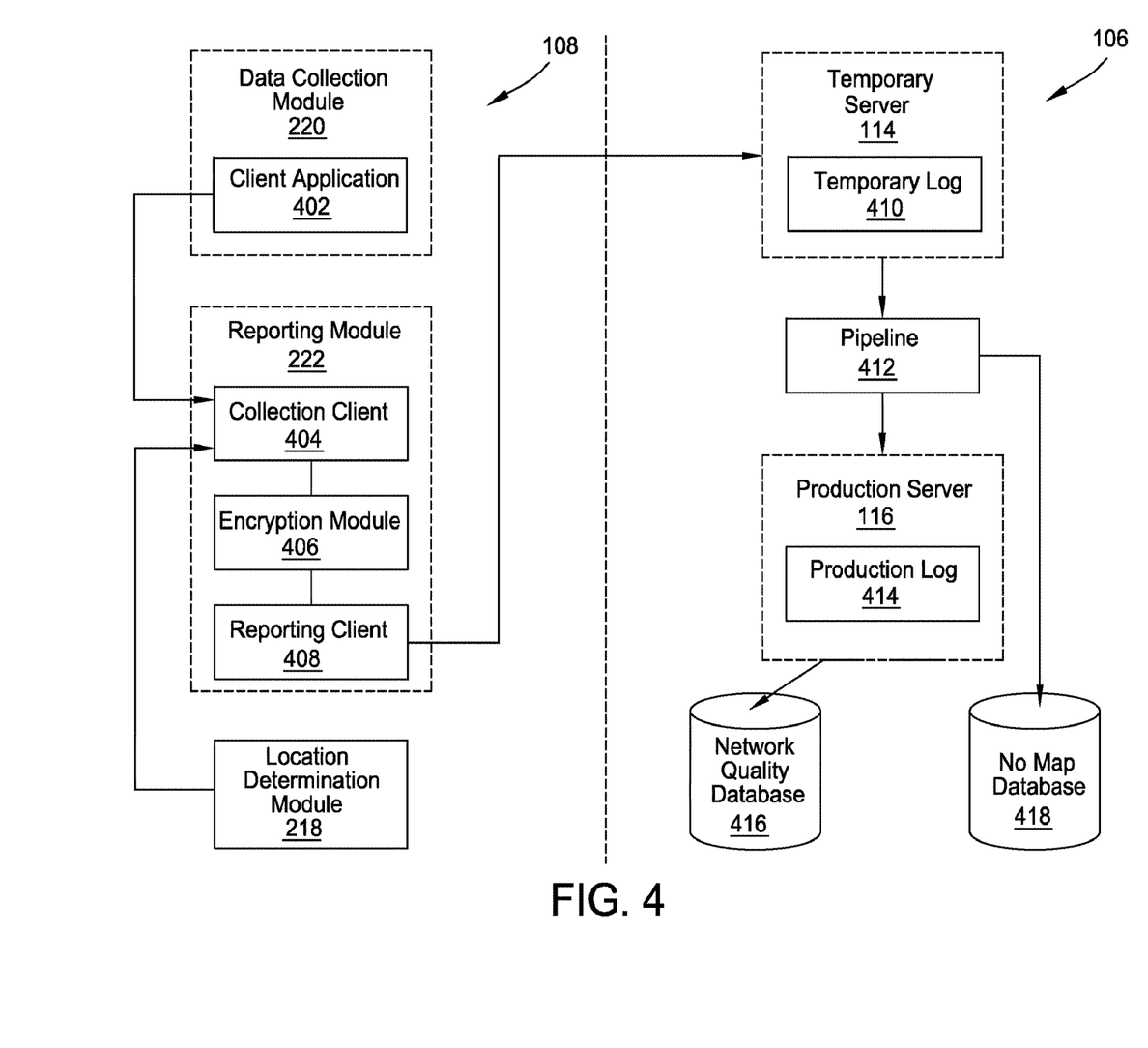
FIG. 4 is a block diagram illustrating a flow of data collected by the client devices of FIG. 1 and stored by the server of FIG. 1, according to an example embodiment.

Turning to FIG. 4, a block diagram including a flow of data collected by the plurality of client devices 102 of FIG. 1 and stored by the server 106 of FIG. 1 is illustrated. Specifically, FIG. 4 illustrates a flow of data collected and reported by a client device 108 (see FIG. 1) to the server 106 where the data is aggregated, filtered and stored. In this regard, the client device 108 includes the data collection module 220, which includes a client application 402. The client application 402 communicates with a wireless network, such as wireless network 110. The client application 402 can be any application residing on the client device 108 that is capable of collecting wireless network quality parameters such as latency and throughput.

Subsequent to collecting the wireless network quality parameters, the client application 402 provides those quality parameters to the reporting module 222. The reporting module 222 includes a collection client 404 that receives the wireless network quality parameters from the client application 402. Upon receiving the quality parameters, the collection client 404 determines whether the client application is an application that is trusted to provide the wireless network quality parameters. In certain embodiments, the collection client 404 will only take wireless network quality parameters from trusted applications. For instance, the collection client 404, prior to accepting the quality parameters from the client application 402, may determine whether the client application 402 is part of a trusted applications list that provides a list of applications that the collection client 404 can trust for the purposes of receiving wireless network quality parameters. If the collection client 404 determines that the client application 402 is a trusted application, then the collection client 404 accepts the wireless network quality parameters.

The collection client 404 also determines the wireless network identification information for the wireless network, such as wireless network 110, that the quality parameters were collected from. The wireless network identification information is associated with the quality parameters and provided to the reporting client 408 for reporting to the server 106. Prior to being reported, the wireless network identification information is obfuscated by an encryption module 406, which hashes the wireless network identification information prior to it being reported to the server 106. Accordingly, the wireless network identification information is reported to the server 106 in an obfuscated state.

As an aside, any suitable hashing function may be used to obfuscate the collected wireless network identification information. For instance, a SHA-256 hashing function may be utilized to obfuscate the wireless network identification information.

Prior to reporting the quality parameters and the associated wireless network identification information, the collection client 404 determines whether location data providing a location of the client device 108 when measuring the quality parameters may be collected and provided to the server 106. The location data is provided to the collection client 404 by the location determination module 218. However, prior to associating the location data with the quality parameters and the wireless network identification information, the collection client 404 determines whether location consent is provided on the client device 108. The collection client 404 will only report location data if the client device 108 provides location consent.

In this regard, there are several instances where the collection client 404 will not append the location data to the quality parameters and the wireless network identification information. One such instance is where the client device 108 does not include a user account associated with the client device. As an aside, the client device 108 may include one or more user accounts associated with various users of the client device 108.

Another instance where location data is not appended is where one or more user accounts associated with the client device 108 indicates that a location history is not to be stored or that the client device 108 is not to report its location. In one embodiment, if one or more user account indicates that location data is not to be collected, the location data will not be appended for all user accounts for client device 108.

If the collection client 404 determines that the client device 108 does not prohibit the collection of location data, then the collection client 404 appends the location data to the quality parameters and the wireless network identification information for reporting by the reporting client 408. In certain embodiments, prior to appending the location data, the collection client 404 anonymizes the location data by associating it only with a pseudonymous (sticky) identifier that only identifies the client device 108 and not a user account associated with the client device 108. This pseudonymous identifier is generated by the collection client 404 for the purposes of identifying the client device 108 associated with the location data. Generally, the pseudonymous identifier is only used for a period of time before it is recycled for use again with different location data. In some embodiments, this time period is seven days or less.

Furthermore, in certain embodiments, the location data is only reported with accuracy between 5-100 meters. Typically, the location data is generally in the form of longitude and latitude measurements. In certain embodiments, upon receiving the longitude and latitude measurements from the location determination module 218, the collection client 404 multiplies each longitude and latitude measurement by 1,000,000 and then truncates any digit beyond six digits after the decimal in order to coarsen the collected data to provide the desired accuracy.

After collection of the quality parameters and the network information including the wireless network identification information and the location data, the collection client 404 provides that data to the reporting client 408 for reporting to the server 106. The server 106 side includes a temporary server 114 including a temporary log 410 that first receives the data from the reporting client 408. The data is retained in the temporary log 410 of the temporary server 114 for a finite period of time, such as seven days. While being retained, the data is processed, scrubbed and anonymized to ensure that the quality parameters and associated wireless network identification information and location data do not identify a user of the client device or include data from a wireless network that indicates it is not to be stored, such as the previously mentioned "_nomap" wireless networks.

After the expiration of the retention period, the temporary server 114 provides the processed, scrubbed and anonymized data from the temporary log 410 to a pipeline 412, which provides the data to the production server 116 that stores it in a production log 414. The data in the production log 414 is aggregated with previously stored data pertaining to the particular wireless network associated with the quality parameters, such as wireless network 110. In this regard, the quality parameters are aggregated with previously collected quality parameters as identified by the wireless network identification information. Further, the location data is aggregated and stored with the quality parameters associated with the wireless network identification information.

Using the aggregated data, a network quality associated with a wireless network, such as wireless network 110 may be determined. The network quality provides a historical indication of performance for that wireless network based on the wireless network quality parameters and the location data. For instance, the wireless network quality may be based on a weighted average of the totality of throughput and latency measurements collected from the plurality of client devices 102 (see FIG. 1) over time, as defined by the collected timestamp indicating a time when the wireless network quality parameters were collected. In this regard, the more recently collected quality parameters could be weighted more heavily in comparison to previously collected wireless network quality parameters in determining the wireless network quality. Once an average score for the network quality is determined, that average could be compared to a known range of average values that assigns a relative network quality score for that wireless network. In certain embodiments, that score could be on a scale from one to ten or from one to one hundred, where a higher score indicates a better performing wireless network, or vice versa.

The wireless network quality is stored in the network quality database 416 and made searchable based on wireless network identification information and location. In this manner, a client device, such as client device 108, that has access to the network quality database 416 can utilize the stored wireless network quality to make informed decisions regarding a variety of tasks the client device 108 may undertake.

The sever(s) 106 side further includes a no map database 418. The no map database 418 provides a log of wireless networks that indicate that quality parameters are not to be collected. Returning briefly to the data collection process performed by the client device 108 of FIG. 4, the collection client 404 determines whether the wireless network includes an indication that the wireless network is not to be included in the wireless network quality database. One such indication would be for a Wi-Fi network with the term "_nomap" in the SSID for an access point of the Wi-Fi network. If the SSID of the access point of the Wi-Fi network includes "_nomap," then no quality parameters will be reported for that Wi-Fi network. However, the BSSID is reported, hashed by the encryption module 406 and stored on the server 106 end in the no map database 418, after being processed through the temporary server 114. The temporary server 114 recognizes that the hashed BSSID is not associated with a hashed SSID and passes it to the pipeline 412 to be stored in the no map database 418.

The no map database 418 is utilized as part of the processing, scrubbing and anonymization process discussed above in regard to the temporary server 114. Accordingly, in the example above including the Wi-Fi network, during the processing, scrubbing and anonymization process performed by the temporary server 114, if the temporary server 114 identifies quality parameters measured from a different access point of the Wi-Fi network with an SSID that does not include "_nomap," then the hashed BSSID from the different access point of the Wi-Fi network is compared against the BSSIDs stored in the no map database 418 to determine whether the different access point is associated with the Wi-Fi network with the access point indicating that quality parameters are not to be collected. If the BSSID of the different access is the same as the BSSID stored in the no map database 418, then the quality parameters and location data associated with the different access point of the Wi-Fi network are discarded and not utilized in the determination of network quality stored in the network quality database.

Additionally, once a wireless network is determined to be stored in the no map database 418, it will remain in the no map database 418 until further wireless network identification information collected from the wireless network indicates that the wireless network no longer prohibits the collection of quality parameters. In certain embodiments, the wireless network identification information for the wireless network in the no map database 418 must no longer indicate that quality parameters are not to be collected for a set period of time, such as seven days before the wireless network will be removed from the no map database 418.

Figure 5:
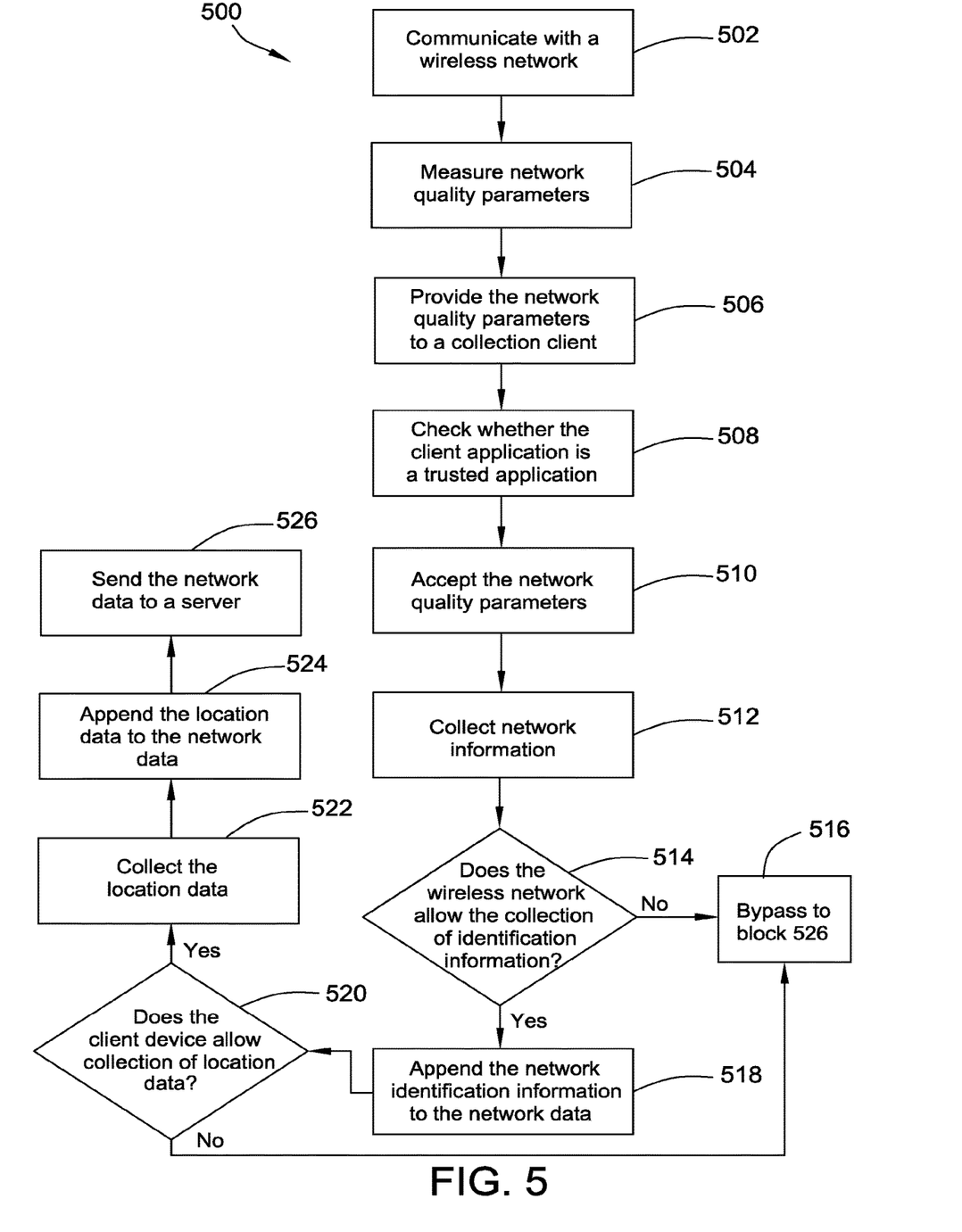
FIG. 5 is a flow diagram illustrating steps performed by a client device for collecting and sending wireless network data, according to an example embodiment.

Turning now to FIG. 5, a flow diagram 500 providing steps performed by a client device, of the plurality of client devices 1-n 102 (see FIG. 1), for collecting and sending wireless network information, including quality parameters, wireless network identification information and location data is illustrated. At step 502, the client device (for ease of description, say client device 108—see FIG. 1) communicates with a wireless network (for ease of description, say wireless network 110). At step 504, a client application 402 (see FIG. 4) of the client device 108 measures quality parameters from the wireless network 110.

At step 506, the quality parameters are provided to a collection client 404 (see FIG. 4) by the client application 402 of the client device 108 (see FIG. 1). At step 508, the collection client 404 checks to determine whether the client application 402 is a trusted application, and, if the client application 402 is trusted, then at step 510, the collection client 404 accepts the quality parameters.

At step 512, the collection client 404 (see FIG. 4) collects wireless network identification information. At step 514, the collection client 404 reviews the wireless network identification information to determine whether it is supposed to be collected; for instance, the wireless network is a Wi-Fi network, and the SSID includes "_nomap." If the SSID does contain "_nomap," then the flow chart proceeds to step 516, which bypasses the remaining steps to step 526 where only the BSSID is reported to the server 106 (see FIG. 1) by the reporting client 408. A further step of hashing the BSSID by the encryption module 406 may be performed prior to step 526.

However, if step 415 (see FIG. 4) determines that there is no indication that quality parameters are not to be collected, then, at step 518, the collection client 404 appends the wireless identification information to the quality parameters. A further step of hashing the BSSID by the encryption module 406 may be performed to obfuscate the wireless identification information prior to transmission to the server 106 (see FIG. 1).

At step 520, the collection client 404 (see FIG. 4) determines whether the client device 108 allows location data collected by a location determination module 218 (see FIG. 2) to be appended to the quality parameters and the wireless network identification information. If location data cannot be appended, then the flow chart proceeds to step 516, which acts as a bypass to step 526 where only the quality parameters and the appended wireless network identification information will be sent to the server 106 (see FIG. 1).

However, if the collection client 404 (see FIG. 4) determines that the client device 108 (see FIG. 1) allows location data to be collected, then at step 522 the collection client 404 receives location data from the location determination module 218 (see FIG. 2), and at step 524, the collection client 404 appends the location data to the quality parameters and the wireless network identification information. At step 526, the collection client 404 provides the quality parameters with the appended wireless network identification information and location data to the reporting client 408, which sends the quality parameters with the appended wireless network identification information and location data to the server 106.

Figure 6:
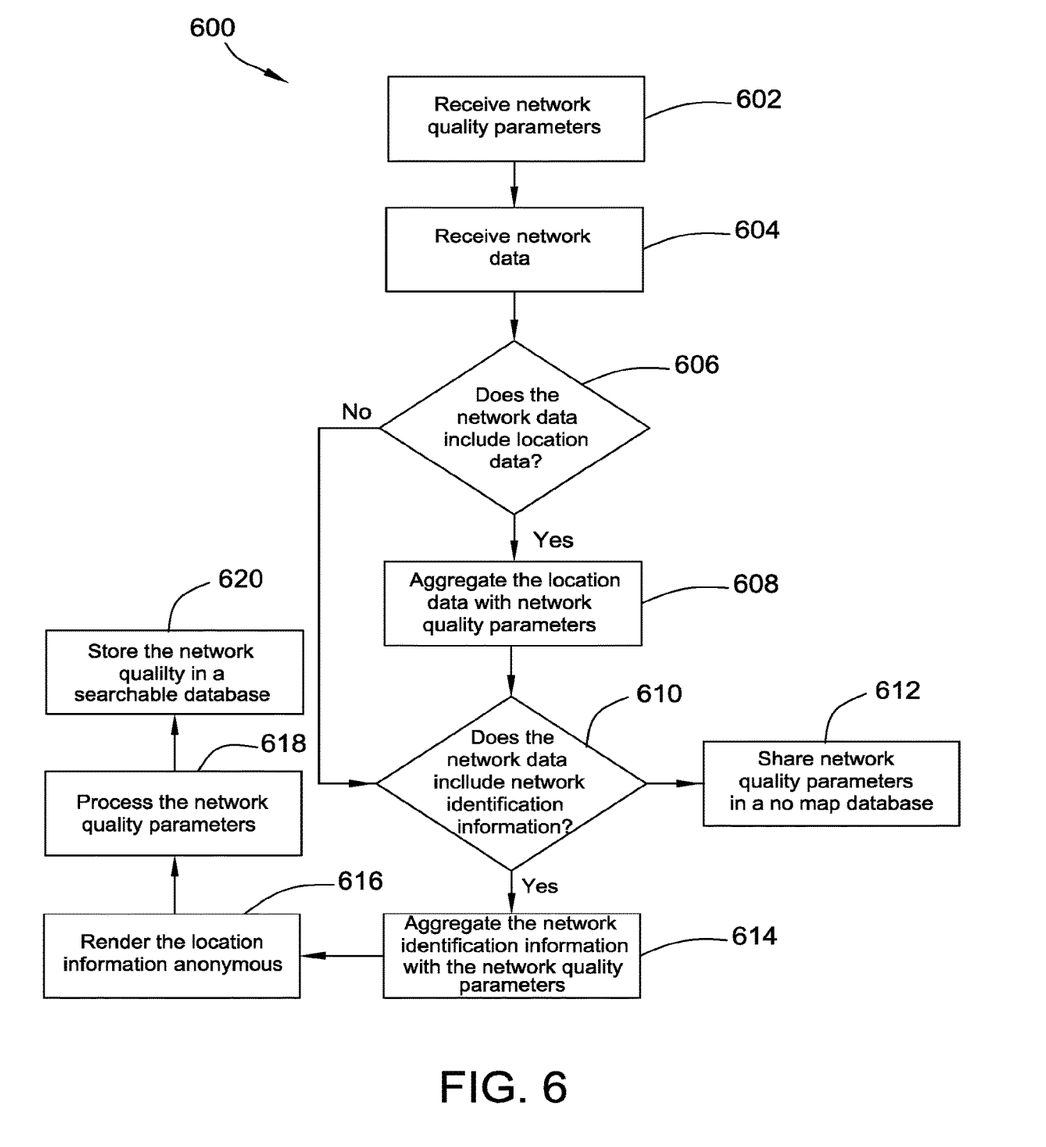
FIG. 6 is a flow diagram illustrating steps performed by a server or cluster of servers for receiving, processing and storing wireless network data, according to an example embodiment.

Turning now to FIG. 6, a flow diagram 600 providing steps performed by a server or cluster of servers for receiving, processing and storing wireless network data is illustrated. At step 602, server 106 (see FIG. 1) receives quality parameters associated with network information, which may include wireless network identification information and location data.

At step 604, the server 106 (see FIG. 1) aggregates the received quality parameters with previously received quality parameters for the wireless network identified by the wireless network identification information. At step 606, the server 106 determines whether location data providing a location of the client device when measuring the quality parameters is provided in the network information. If location data is provided, then at step 608, the server 106 aggregate the location data along with the quality parameters for the wireless network identified by the wireless network identification information. However, if location data is not present in the network information, then the flow chart 600 bypasses step 608 and proceeds directly to step 610.

At step 610, the server 106 (see FIG. 1) processes the aggregated quality parameters to determine a network quality of the wireless network and determines whether the wireless network data includes network identification information. If no identification information is present, such as in situations where an SSID of a WiFi network includes "_nomap," at step 612, the server 106 temporarily stores the network quality absent any identification information in a no map database 418 (see FIG. 4). If the wireless network data does include identification information, then at step 614, the identification information is aggregated along with the network quality parameters. At step 616, the location information aggregated with the network quality parameters is rendered anonymous, and at step 618, the network quality parameters are processed to determine a network quality. At step 620, the network quality is stored in a network quality database 416 (see FIG. 4). The network quality stored in the network quality database 416 is searchable based on wireless network identification information and further searchable based on a geographic location.

Figure 7:
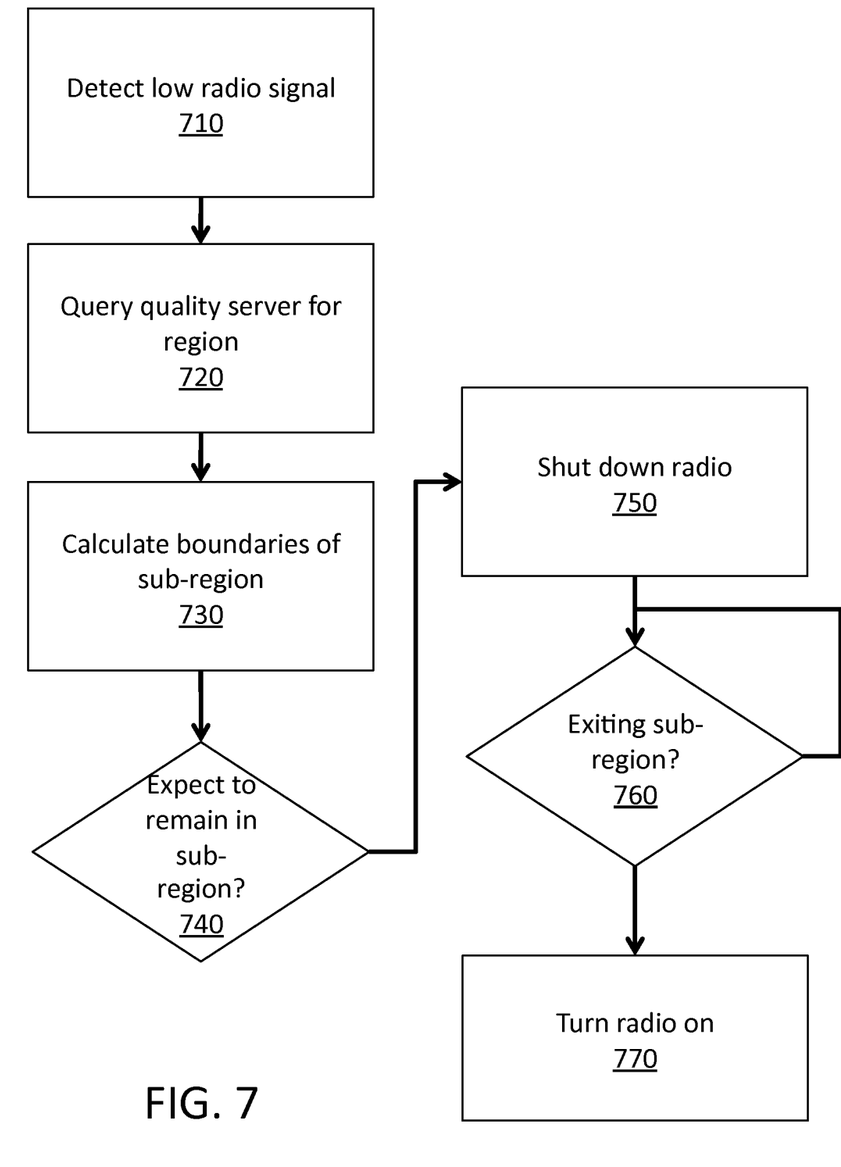
FIG. 7 is a flow diagram illustrating steps performed by a client device for automatically powering off unnecessary radios, according to an example embodiment.

Turning to FIG. 7, a flow diagram 700 providing steps performed by a client device for automatically reducing power to unnecessary radios is illustrated. At step 710, the client device detects that the signal strength for one of its radios (see, e.g., FIG. 2, 224, 226) is lower than some threshold value. The threshold value may be set in a variety of manners. For example, in certain embodiments, the threshold value may be set and adjusted by a user of the client device, or be a preset value. In other embodiments, the threshold value may loaded and updated in the client device by a signal quality server (e.g., the Production Server 116 of FIGS. 3 and 4). Additionally, the threshold value may be different for the various types of wireless networks. For example, the threshold value may be different for LTE networks as compared to WCDMA networks, or as compared to WiFi networks.

The client device queries the signal quality server (e.g., the Production Server 116 of FIGS. 3 and 4) at step 720 and receives an indicia of radio signal strength (such as RSSI) for a plurality of locations within a geographic region. Preferably, the client device receives quality information on the computed latency and throughput of the network, as aggregated and calculated from previously collected client data. For example, in response to the query, the device may receive signal strength information for locations in a 200*km* radius of the device's present location. The determination of the geographic region can be pre-programmed in the device and/or can be set or adjusted manually or automatically based on selected criteria. In some embodiments, the radius is dynamically determined known minimum distances to regions known to have quality signal strength (e.g., if the only network near a client is known to have sparse coverage, the radius may be larger; if a second, more densely covered network is nearby, the radius may be smaller).

At step 730, the device uses the information returned from the query to calculate a sub-region or "geo-fence" including locations whose signal strength or other quality metrics are known to be below a set threshold value. In some embodiments, the geo-fence is calculated using known techniques, such as defining a circular region of a given radius using specified coordinates. The device preferably monitors its location to determine whether it is within the geo-fenced area, and takes an action accordingly. One example of processes for defining and using geo-fences is described in "Creating and Monitoring Geofences" (https://developer.android.com/training/location/geofencing.html, accessed Jul. 20, 2015), which is fully incorporated herein for all that it teaches. In one embodiment, at step 740 the device determines whether it will remain within the sub-region for a minimum length of time. For example, if the sub-region is very small, and the device is in motion (e.g., traveling in a car), then no action may be taken. If it is expected that the device will remain within the sub-region for at least a set period of time, then the low-signal strength radio is turned off, at step 750, thereby conserving power. The speed of the device (e.g., how fast the car is moving) and the area of the region may be taken into account for the determination of step 740. Additionally, a map may be presented on the device, identifying to the user the boundaries of the sub-region so that the user may become more aware of the low network quality. The map may be color-coded, or otherwise indicate to the user different levels of network quality. Periodically thereafter, at step 760, the device determines (through the use of, e.g., GPS) whether it is still within the sub-region, or if it is exiting the sub-region. When it is determined that the device is exiting the sub-region, then the radio is turned back on at step 770. In one embodiment, steps 760 and 770 may be performed independently from steps 710-750. That is, for example, with the radio already in a reduced power mode while traveling in a known remote area, power is restored upon determination that the device has entered a region of high network connectivity. Additionally, upon exiting the sub-region, the device may transmit network quality information to the signal quality server, so that it may update its database with more current statistical information.

Figure 8:
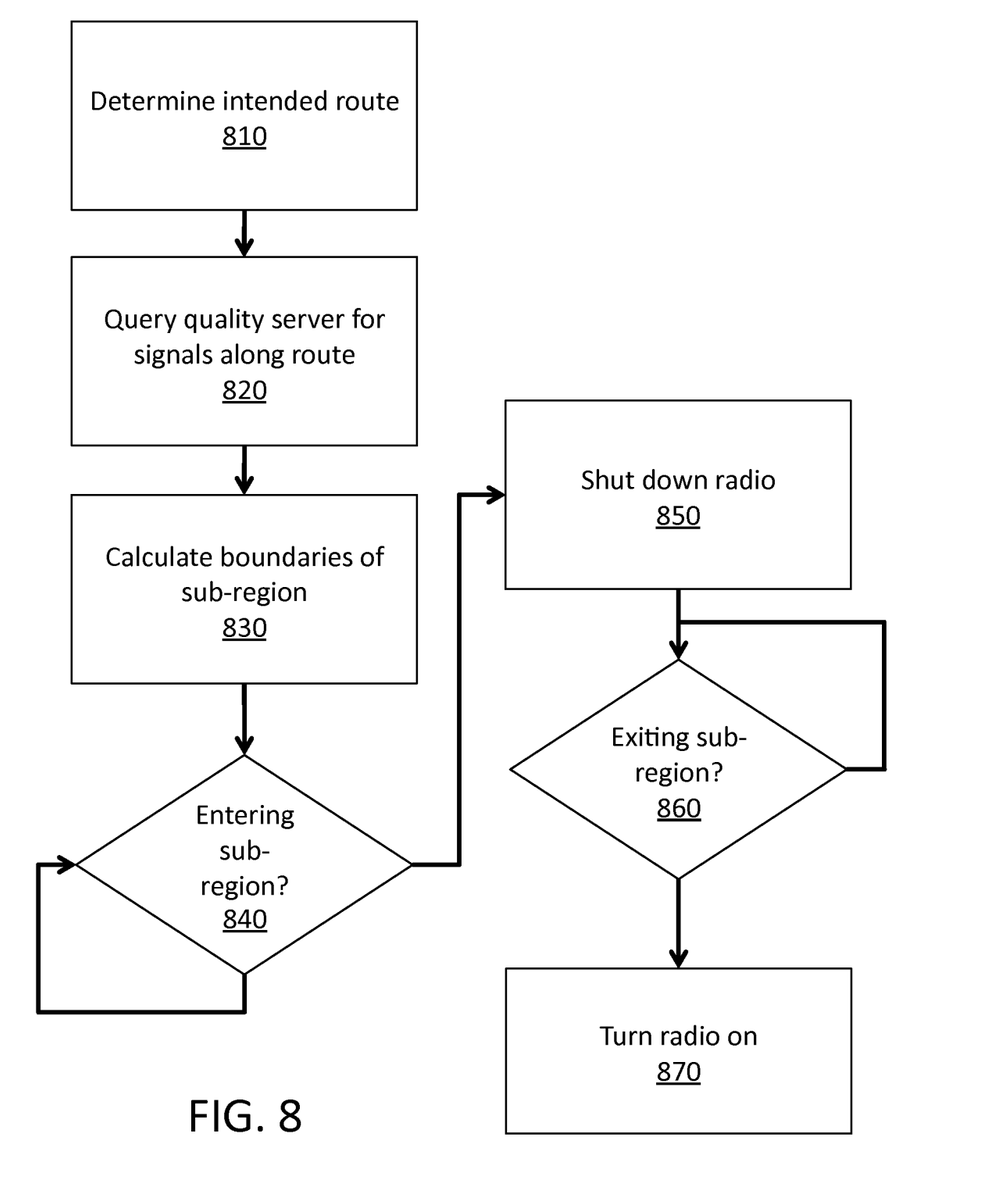
FIG. 8 is a flow diagram illustrating steps performed by a client device for automatically powering off unnecessary radios in conjunction with a travel application, according to an example embodiment.

Turning to FIG. 8, a flow diagram 800 providing steps performed by a client device for automatically reducing power to unnecessary radios, in conjunction with a travel application is illustrated. Such steps may be used with an application such as Waze or other route planning program running on the client device. At step 810, the intended route of travel is determined, either manually or automatically by the travel application. The client device queries a signal quality server (e.g., the Production Server 116 of FIGS. 3 and 4) at step 820 and receives signal strength and/or network quality information for a plurality of locations within a geographic region including the intended route. At step 830, the device uses the information returned from the query to calculate a sub-region or "geo-fence" including locations whose signal strength and/or network quality is known to be below a set threshold value. The device monitors its location as it travels the intended route, and determines at step 840 whether it has entered the sub-region of known low signal quality. When it enters the sub-region, it proceeds to reduce power to or shut down the affected radio at step 850, thereby conserving power. The device continues to monitor its location along the intended route to determine, at step 860, whether it is exiting the sub-region of low signal or network quality. When the device exits the sub-region, it turns power back on to the affected radio at step 870.

Figure 9:
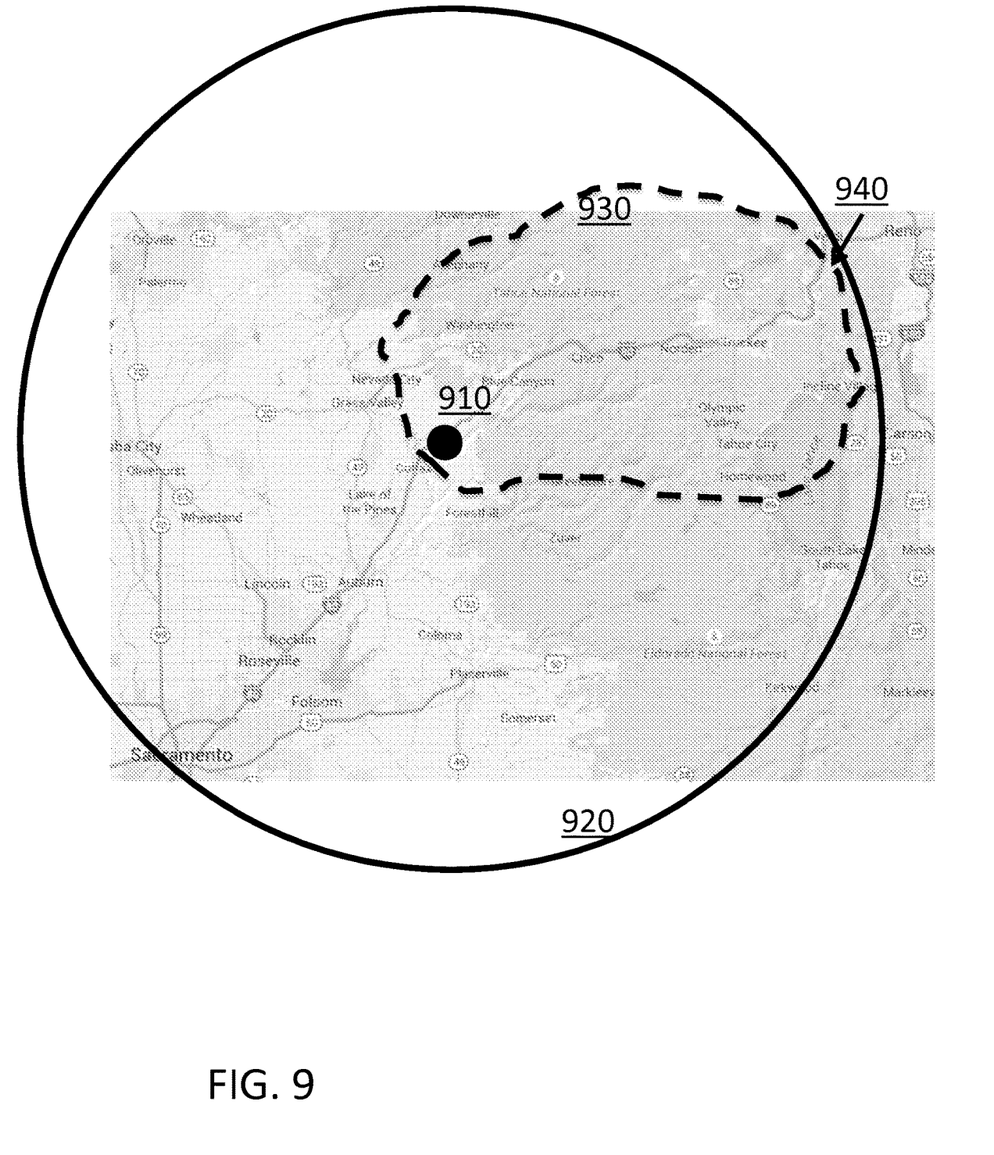
FIG. 9 is a diagram illustrating determination of a geofenced area for automatically powering off unnecessary radios, according to an example embodiment.

FIG. 9 illustrates an example of how embodiments may be used on a hypothetical car trip from Sacramento to Reno along Interstate 1-80. As the device travels from Sacramento, it monitors signal strength for at least one of its radios, e.g., its radio for CDMA data communications. When it detects that the signal strength is beneath a threshold value, at location 910, it queries the signal quality server/database and receives information regarding signal strength locations within a pre- or post-determined radius 920. Using this information, the device constructs a "geo-fence" sub-region 930, where signal strength is known to be beneath the threshold value. The affected radio on the device is then automatically shut down, or power is reduced, while it travels along 1-80, thereby conserving power. When the device exits the sub-region at point 940, the radio is automatically turned on, as signal strength is known to be above the threshold value.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the objectives of the disclosure. Variations of those preferred embodiments may become apparent to those of ordinary skill in the art upon reading the foregoing description. The inventors expect skilled artisans to employ such variations as appropriate, and the inventors intend for the disclosed embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of managing power consumption in one or more radios in a wireless client device, the method comprising:
    receiving, by the wireless client device, an indication of a desired destination;
    determining, by the wireless client device, an intended travel route to reach the desired destination;
    receiving, by the wireless client device from a signal quality server, indicia of network quality for a plurality of locations along the intended travel route;
    calculating, by the wireless client device, a physical boundary region for a geographic area based on the received indicia of network quality for the plurality of locations along the intended travel route, wherein the received indicia of network quality for locations within the geographic area indicate that network quality is lower than a set threshold value;
    predicting, by the wireless client device, whether the wireless client device physically located within the geographic area will remain in the geographic area for at least a threshold period of time;
    when the wireless client device is predicted to not remain in the geographic area for at least the threshold period of time, maintaining, by the wireless client device, power to a low-signal strength radio of the one or more radios in the wireless client device for communicating over a data network; and
    when the wireless client device is predicted to remain in the geographic area for at least the threshold period of time:
        reducing, by the wireless client device, power to the low-signal strength radio; and
        maintaining, by the wireless client device, power to a location services radio of the one or more radios in the wireless client device for determining physical locations of the wireless client device, the low-signal strength radio for communicating over the data network being associated with the received indicia of network quality.

2. The method of claim 1, further comprising:
    determining a second physical location of the wireless client device using the location services radio for determining the physical locations of the wireless client device;
    determining, by the wireless client device, that the second physical location is outside of the geographic area; and
    increasing, by the wireless client device, power to the low-signal strength radio for communicating over the data network.

3. The method of claim 2, wherein reducing power to the low-signal strength radio for communicating over the data network comprises shutting off the low-signal strength radio for communicating over the data network, and wherein increasing power to the low-signal strength radio for communicating over the data network comprises restoring power to the radio for communicating over the data network.

4. The method of claim 1, wherein the indicia of network quality are for cellular communications radio signals or WiFi radio signals.

5. The method of claim 1, wherein the set threshold value is adjustable by a user.

6. The method of claim 1, further comprising transmitting, from the wireless client device to the signal quality server, network information and network quality information for updating a database of network statistics.

7. The method of claim 6, further comprising transmitting, from the wireless client device to the signal quality server, location information comprising a latitude, a longitude, and a timestamp of when the location information is determined for updating the database of network statistics.

* * * * *